Aug. 31, 1965 W. W. WARD 3,203,675

MIXING GUN

Filed June 19, 1963 5 Sheets-Sheet 1

INVENTOR.
WALLACE W. WARD

BY

Emery, Whittemore, Sandoe & Graham

ATTORNEYS.

Aug. 31, 1965 W. W. WARD 3,203,675

MIXING GUN

Filed June 19, 1963 5 Sheets-Sheet 2

INVENTOR.
WALLACE W. WARD

BY [signature]

ATTORNEYS.

INVENTOR.
WALLACE W. WARD

BY

ATTORNEYS.

MIXING GUN

Filed June 19, 1963 5 Sheets-Sheet 4

INVENTOR.
WALLACE W. WARD

BY

ATTORNEYS.

MIXING GUN

Filed June 19, 1963 5 Sheets-Sheet 5

INVENTOR.
WALLACE W. WARD

BY

ATTORNEYS.

United States Patent Office 3,203,675
Patented Aug. 31, 1965

3,203,675
MIXING GUN

Wallace W. Ward, Chatham, N.J., assignor to Louis F. Muccino, Rye, N.Y.

Filed June 19, 1963, Ser. No. 288,933
8 Claims. (Cl. 259—7)

The invention relates to devices for proportioning, mixing or blending, and intermittently discharging metered quantities of two-part liquid polymer resin systems.

In certain types of liquid polymer resin systems such as epoxy resins and polyurethanes, for example, the system comprises two components which must be mixed or blended in the desired proportions. In the case of polyurethanes, for example, a quantity of a so-called prepolymer must be blended in the desired proportions with a quantity of an activator or catalyst.

The device of the present invention is cyclic in operation and comprises a mixing chamber and a discharge orifice. On each cycle of operation metered quantities of the two components are fed to the mixing chamber in the desired proportions, are there mixed or blended together, and the mixture is discharged through the discharge orifice.

It is a characteristic of such resin systems that as soon as the individual components are blended, they begin to react, with resultant increase in viscosity and loss of flowability of the mixture. The rapidity of the reaction depends on the particular components of the mix and on the proportions used, but in some cases the reaction proceeds very rapidly so that an initial set of the blended components may be achieved in a matter of only a few seconds. It is also a characteristic of such resin systems that the individual components may be somewhat compressible.

For these reasons it is desirable that the passages from the metering chambers to the mixing chamber in which the components are blended be as short as possible in order to preserve the correct volumetric relationships of the metered components. It is also desirable that the mixing chamber be small so that the residue of blended components remaining in the mixing chamber after discharge may be as small as possible. It is also important to provide means for purging the device with a suitable solvent whenever cyclic operation is discontinued.

It is an object of the invention to provide means for feeding metered quantities of the components of the resin system to the mixing chamber, and to provide means for quickly and easily varying the proportions of the components fed to the mixing chamber, as desired.

It is a further object of the invention to provide positively operated valves for controlling the flow of the components through the device in order to guard against (1) premature flow of unmetered material to the mixing chamber and (2) return flow of metered materials through the supply passages.

Another object of the invention is to provide means for mixing and discharging metered quantities of a two-part liquid polymer resin system in which the metered components have but a short path to travel to the mixing chamber, and in which the mixed material has but a short path to travel between mixing and discharge and in which a minimum of mixed material is left in the mixing chamber.

Another object of the invention is to provide means for mixing and discharging metered quantities of a two-part liquid polymer resin system in which adequate mixing and homogenization of the components are obtained as well as uniformity of shot size even for small volumes.

A still further object of the invention is to provide means for mixing and discharging metered quantities of a two-part liquid polymer resin system with the foregoing objects in mind which is less expensive, less complex, and more easily maintained than has heretofore been possible.

Other objects and advantages of the invention will appear hereinafter.

A preferred embodiment of the invention selected for purposes of illustration is shown in the accompanying drawings, in which, FIGURE 1 is a top plan view, partly broken away.

Figure 1:
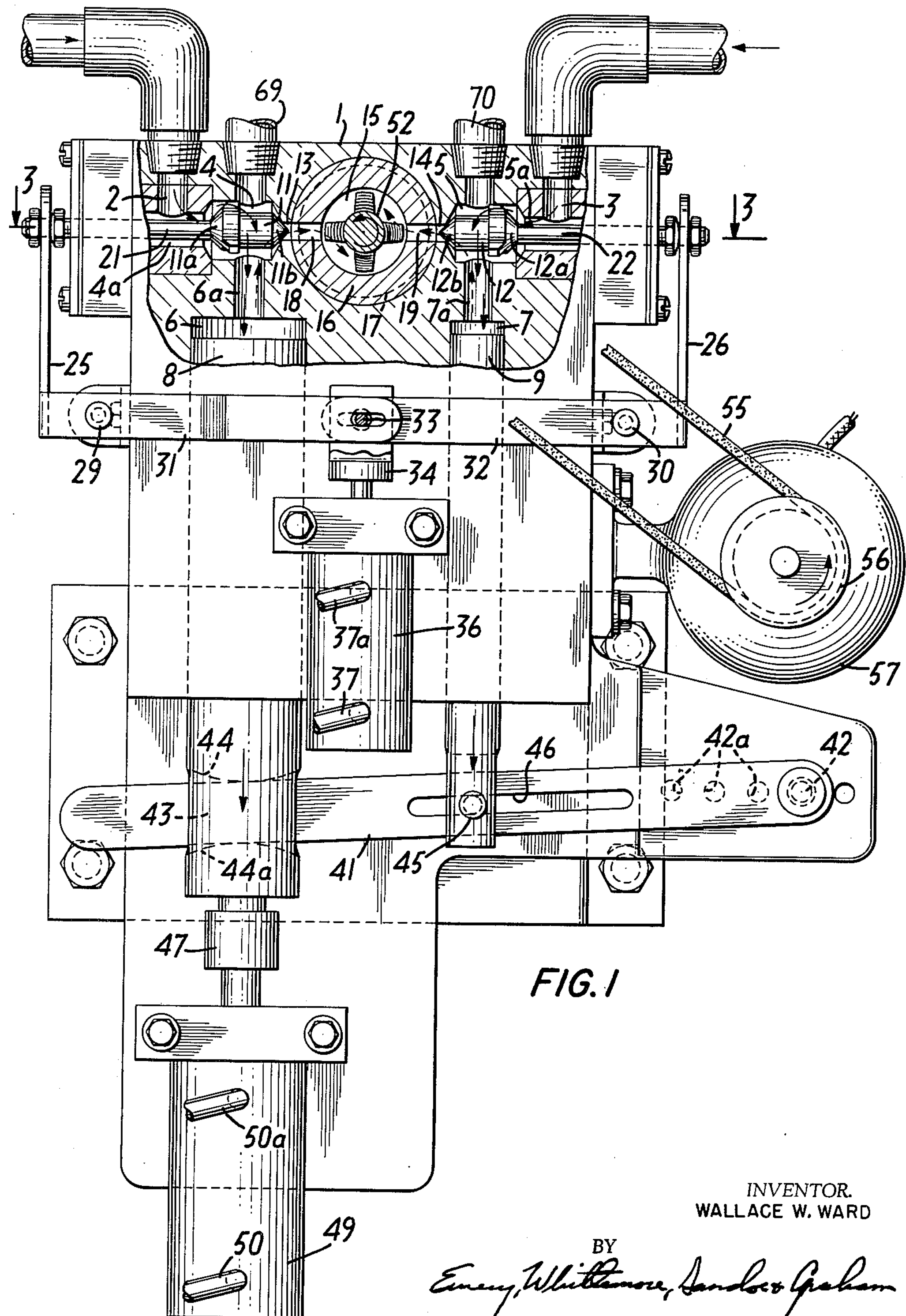

Referring to the drawings, as shown in FIGURE 1, the device comprises a block 1 having inlet passages 2 and 3 therein, the inlet passage 2 opening into a valve chamber 4 through passage *4a* and the inlet passage 3 opening into the valve chamber 5 through a passage *5a*. The passage 2 is preferably used as an inlet passage for the prepolymer component, while the passage 3 is used as an inlet passage for the activator or catalyst component.

The block 1 is also provided with two cylindrical chambers 6 and 7 within which are mounted the plungers 8 and 9, respectively, said chambers being referred to hereinafter as metering chambers, because, as explained hereinafter, they and the plungers 8 and 9 are used to meter the quantities of prepolymer and activator or catalyst which are fed to and discharged from the mixing chamber on each cycle of operation. Chamber 6 and plunger 8 may conveniently be somewhat larger in cross section than chamber 7 and plunger 9, for in most cases the intake of the prepolymer component will be greater than that of the activator or catalyst component to obtain the desired mix.

The chamber 6 opens into the valve chamber 4 through passage *6a* and the chamber 7 opens into the valve chamber 5 through passage *7a*.

A double acting valve 11 is mounted in the valve chamber 4, having a conical face *11a* which is adapted to seat against and close the orifice of passage *4a* to control flow of the prepolymer component from the inlet passage 2 through valve chamber 4 to the chamber 6, and having a conical face *11b* which is adapted to seat against and close the orifice of passage 13 to control flow of the prepolymer component from the chamber 6 to the mixing chamber 15 hereinafter described.

A similar double acting valve 12 is mounted in the valve chamber 5, having a conical face *12a* which is adapted to seat against and close the orifice of passage *5a* to control flow of the activator or catalyst component from the inlet passage 3 through valve chamber 5 to the chamber 7, and having a conical face *12b* which is adapted to seat against and close the orifice of passage 14 to control flow of the activator or catalyst component from the chamber 7 to the mixing chamber 15.

In the preferred embodiment illustrated, the mixing chamber 15 is formed as a recess in the lower end of the member 16 of circular cross section which fits into and extends through the bore 17 of circular cross section formed in the block 1 between the valve chambers 4 and 5. In the embodiment illustrated, the member 16 and bore 17 are cylindrical, but they may also be of conical shape, if desired. The member 16 is provided with lateral passages 18 and 19 which register with passages 13 and 14, respectively, to provide communication between the mixing chamber 15 and the valve chambers 4 and 5 respectively. By thus forming the mixing chamber in a separate member 16 which can be quickly removed from the block 1, when desired, it is possible to provide easy access to both the mixing chamber and to the valve chambers 4 and 5 for cleaning purposes. It is also possible to provide a stand-by mixing chamber for quick and easy substitution. When the member 16 is in place, it is, in effect, a part of the block 1, and provides, with the block 1, a housing within which all of the necessary passages and chambers through which the materials flow are found.

Figure 3:
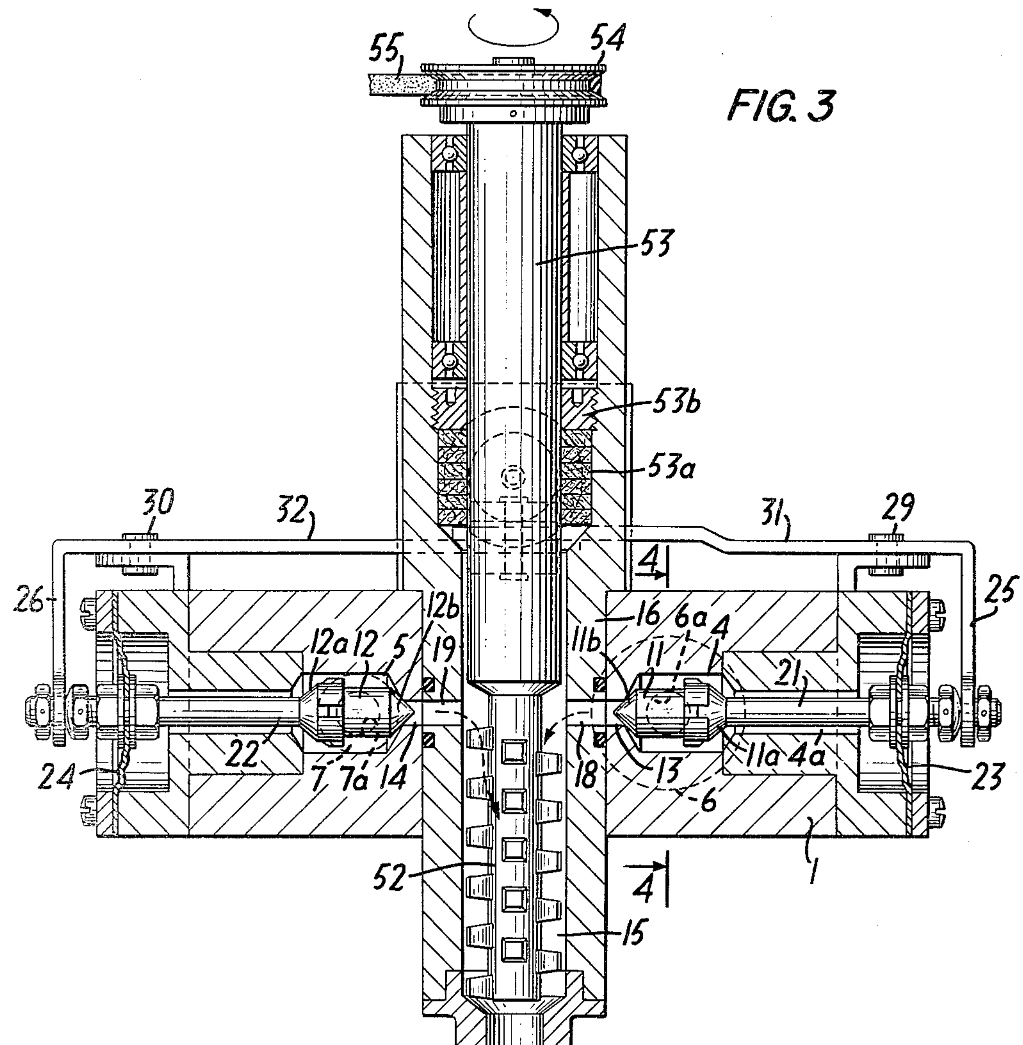
FIGURE 3 is a vertical section on the line 3—3 of FIGURE 1.
Figure 4:
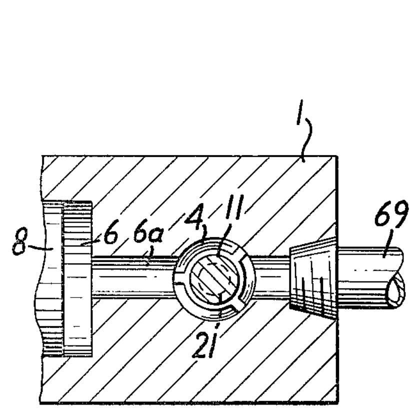
FIGURE 4 is a section on the line 4—4 of FIGURE 3.

From the foregoing, it will be noted that if the valve 11 is moved to the position illustrated in FIGURES 1 and 3, the conical face **11*b* is seated against and closes the orifice to passages 13 and 18 to prevent flow from the valve chamber 4 into the mixing chamber 15. Under these conditions, the orifice to passage 4*a* remains open to permit flow of prepolymer into the valve chamber 4 through the inlet passage 2. If, now, the plunger 8 is retracted, prepolymer will be drawn into the passage 6 in a quantity determined by the length of the retracting stroke of the plunger 8**.

Then, if the valve 11 is moved to the left so that the conical face **11*a* is seated against and closes the orifice to the passage 4*a*, communication between the valve chamber 4 and the inlet passage 2 is closed, which not only prevents further inflow of prepolymer into the valve chamber, but also prevents return flow from the valve chamber to the inlet passages. At the same time, the movement of the valve 11 to the left opens the orifice to passages 13 and 18, to open communication between the valve chamber and the mixing chamber. Then, if the plunger 8 is advanced, prepolymer will be ejected from the chamber 6 and forced into the mixing chamber 15**.

In similar manner, similar operation of the valve 12 and plunger 9 will draw activator or catalyst into the chamber 7 and eject activator or catalyst from the chamber 7 into the mixing chamber 15, and if the valves 11 and 12 are operated simultaneously and plungers 8 and 9 are operated simultaneously, the prepolymer and activator or catalyst will be fed simultaneously to the mixing chamber for proper mixing.

Valves 11 and 12 are mounted on valve stems 21 and 22, respectively, which extend through flexible diaphragms 23 and 24, as shown in FIGURE 3, for operative connection to depending arms 25 and 26 of bell cranks which are pivoted on the block 1 at 29 and 30. Diaphragms 23 and 24 flex to permit valve stems 21 and 22 to move laterally upon activation by depending arms 25 and 26 of the bell cranks. The other arms 31 and 32 of the bell cranks are connected by a pin 33 to an actuating member 34 adapted to actuate the bell cranks and the valves 11 and 12 simultaneously, as shown in FIGURE 1.

In the embodiment illustrated, the actuating member 34 is connected to the piston of a cylinder 36, having tubular conduits 37 and **37*a* connected thereto at its rear and front ends, respectively, through which fluid pressure may be supplied to actuate the piston in the desired direction to operate the valves 11 and 12** when desired.

Plungers 8 and 9 are pivotally connected to a bar 41 pivoted on the block 1 at 42. For this purpose, plunger 8 is provided with a slot 43 through which the bar 41 extends and engages the rounded faces 44, **44*a* on which it fulcrums. Also plunger 9 is provided with a pin 45 which extends through and pivots in elongated slot 46 of bar 41. The block 1 has a series of holes 42*a* formed therein at spaced intervals to receive the pivot pin 42. As shown, the bar 41 constitutes a lever system in which the effective length of the lever arms may be varied by changing the position of the pivot pin 42. As will be understood, whenever the position of pivot pin 42 is changed a given stroke of the bar 41 will result in a change in the length of the stroke of the plunger 9 relative to the stroke of plunger 8**, and will thereby vary the proportions of prepolymer and activator fed to the mixing chamber.

In the embodiment illustrated, the bar 41 is actuated by actuating member 47 connected to the piston of a cylinder 49 having tubular conduits 50 and **50*a* at its rear and front ends, respectively, through which fluid pressure may be supplied to operate the piston in the desired direction to actuate the bar 41 and plungers 8 and 9**.

Mounted for rotation within the mixing chamber is an impeller 52 carried on a shaft 53 extending lengthwise of the cylindrical member 16 as shown in FIG. 3.

Figure 2:
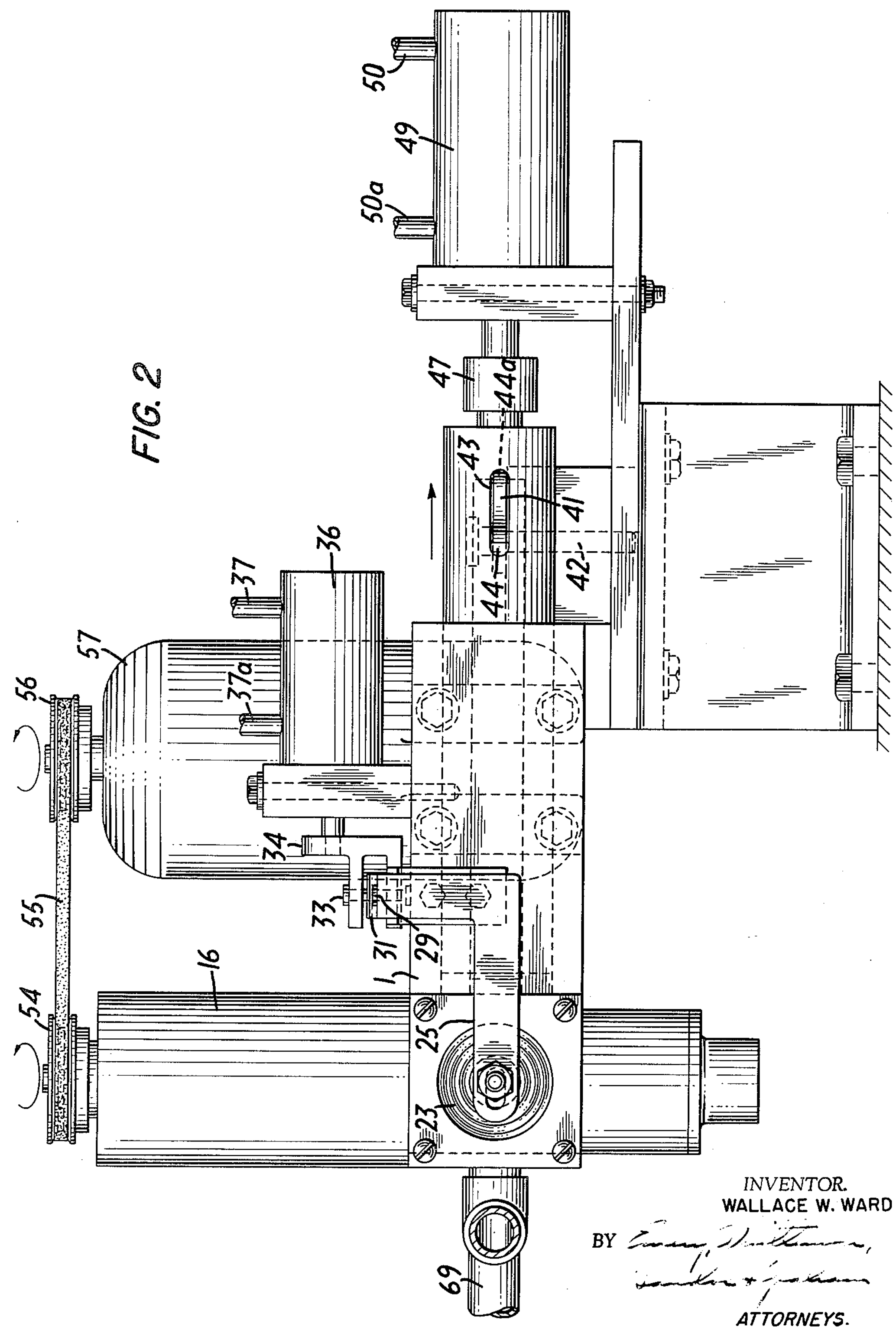
FIGURE 2 is a side elevation.

Shaft 53 is ensheathed in packing **53*a* held in place by packing gland 53*b* and carries a pulley 54 for connection by belt 55 with pulley 56 on the shaft of an electric motor 57 as shown in FIGURE 2. During operation, the impeller is rotated by motor 57 to thoroughly mix and blend the two components fed to the mixing chamber. The mixture is discharged through the orifice 58**.

Suitable valves for controlling the application of fluid pressure to the cylinders 36 and 49 through the tubular connections 37, **37*a*, 50, and 50*a*** may be manually operated, if desired, but provision for automatic operation in predetermined timed sequence is preferable.

Figure 5:
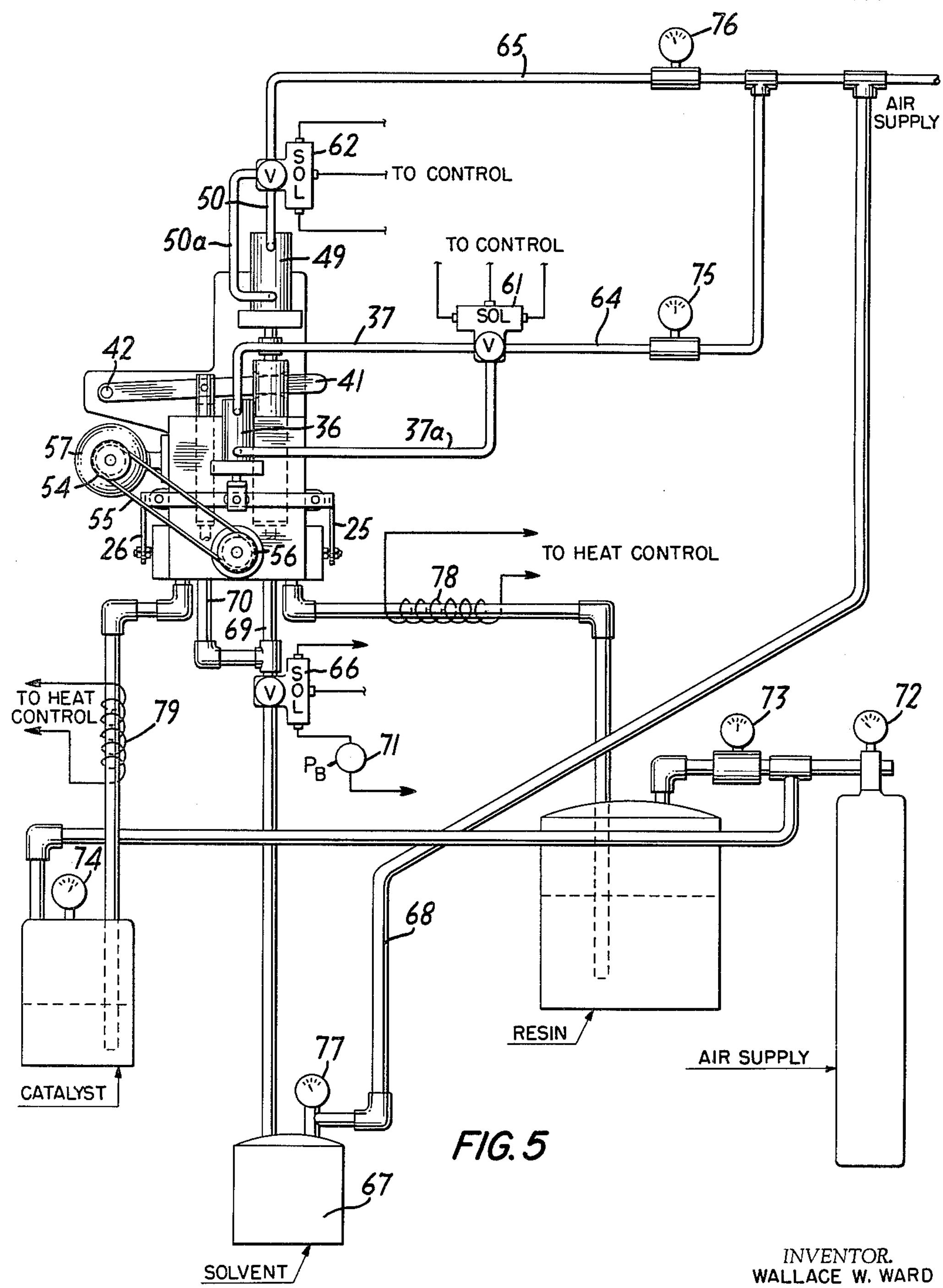
FIGURE 5 is a semi-diagrammatic view showing supply lines and control devices.

For this purpose, as shown in FIGURE 5, a solenoid operated valve 61 of conventional construction may be provided for controlling application of fluid pressure to cylinder 36, and a similar solenoid operated valve 62 may be provided for controlling application of fluid pressure to cylinder 49. The tubular connections 37 and **37*a* are connected to valve 61 and tubular connections 50 and 50*a* are connected to valve 62. Valves 61 and 62 are connected to a suitable source of fluid pressure, such as a tank of compressed air, by tubular connections 64 and 65**.

Solenoid operated valve 66 controls a purge system utilizing a solvent, such as acetone, held in container 67. Fluid pressure is supplied to container 67 through tubular connection 68 which is connected to a suitable source of fluid pressure such as a tank of compressed air. Valve 66 is synchronized with valves 61 and 62 so that solvent can flow from container 67 only when inlet passages 2 and 3 for the prepolymer and catalyst components respectively are closed by valves 11 and 12 respectively and passages 13 and 14 which register with lateral passages 18 and 19 respectively are open. Thus, solvent entering through tubular connections 69 and 70 can flow through valve chambers 4 and 5 respectively and out mixing chamber 15, but cannot flow into inlet passages 2 and 3 for the prepolymer and catalyst components respectively. A manual switch 71 is connected in series with valve 66. Switch 71 is normally open and valve 66 is normally closed. The purge system cannot be operated until the circuit is closed by closing switch 71. FIGURE 5 also shows pressure gages 72–77, located at appropriate places in the pressure system, and heat supply means 78 and 79 to control the temperature of the prepolymer and catalyst components respectively.

Figure 6:
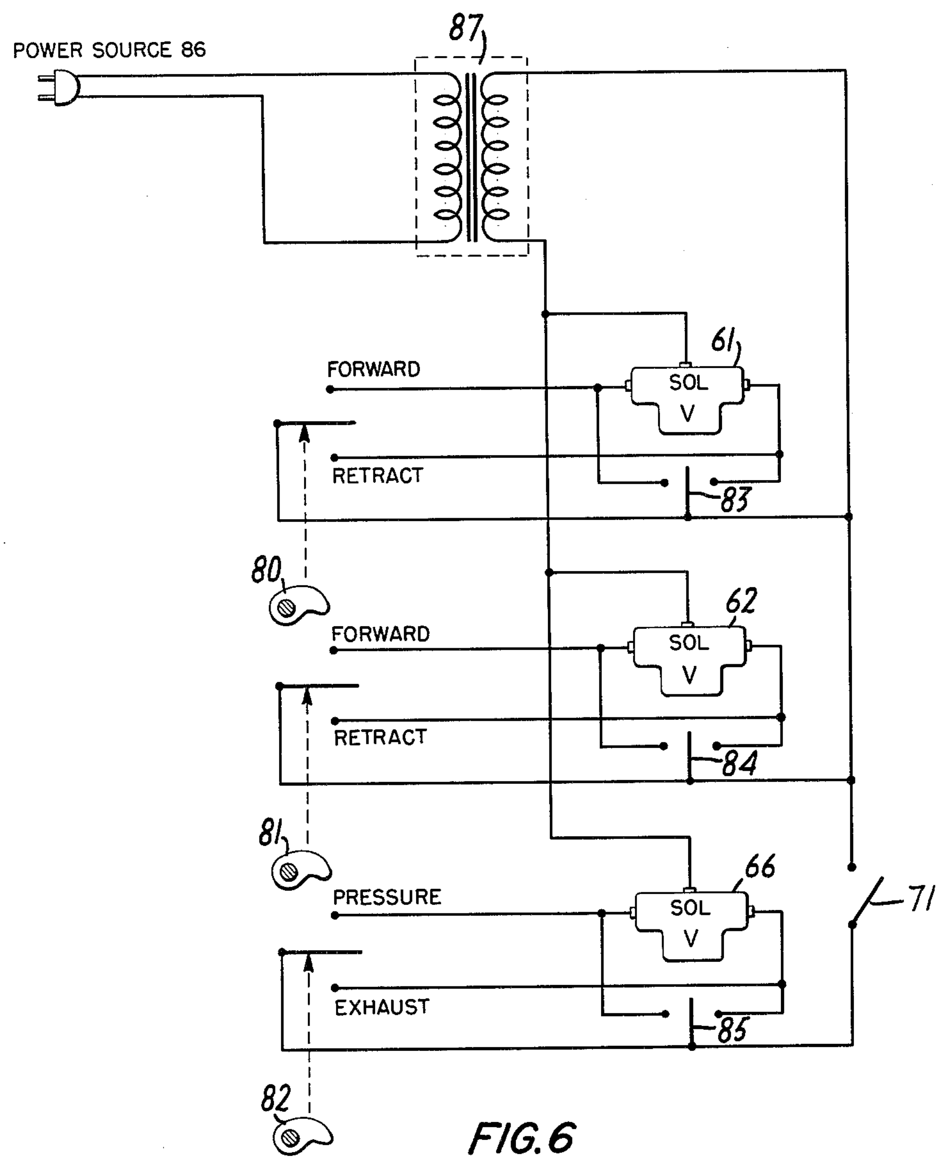
FIGURE 6 is an electrical wiring diagram.

Electrical circuits for controlling the operation of the solenoids are illustrated in FIGURE 6. Cams 80, 81 and 82 provide automatic control for the opening and closing of valves 61, 62 and 66 respectively. Switches 83, 84 and 85 provide manual control to operate valves 61, 62 and 66 respectively. Power for the system is supplied through power source 86 and transformer 87, which changes the alternating current to direct current. Button 71 ensures that valve 66 is disconnected from the line until it is desired to purge the system.

As set forth in the foregoing specification, the device of the present invention proportions, blends and intermittently discharges metered quantities of multipart liquid polymer resin systems. For convenience and brevity in the appended claims, however, the said device will be referred to merely as a "mixing gun."

Moreover, the term "mixing" will be used to denote any mixing, blending or other operation by which the two components of a resin system are intimately intermingled, one with another. Also, the term "catalyst" will be used to denote any activator or other component of a resin system used to react with the prepolymer component of the system.

It will be understood that the invention may be variously modified and embodied within the scope of the subjoined claims.

I claim as my invention:

1. A mixing gun comprising a housing having a mixing chamber formed therein, said housing also having two separate valve chambers and a separate passage connecting each of said valve chambers to said mixing chamber, said housing also having a separate supply passage connecting each of said valve chambers to a source of supply of a liquid component, said housing also having two metering chambers formed therein with one of said metering chambers opening into one of said valve chambers and the other of said metering chambers opening into the other of said valve chambers, a reciprocating plunger mounted in each of said metering chambers, valves mounted in said valve chambers, means for operating said valves to open communication between said valve chambers and said supply passages and to close communication between said valve chambers and said mixing chamber, and for operating said valves to close communication between said valve chambers and said supply passages and to open communication between said valve chambers and said mixing chamber, and means for reciprocating said plungers to alternately fill and discharge said metering chambers.

2. A mixing gun as claimed in claim 1 in which said means for operating said valves includes means for actuating said valves simultaneously from a common actuator.

3. A mixing gun as claimed in claim 1 in which said means for reciprocating said plungers includes means for actuating said plungers simultaneously from a common actuator.

4. A mixing gun as claimed in claim 1 in which said means for reciprocating said plungers includes means for varying the strokes of said plungers relative to each other.

5. A mixing gun as claimed in claim 1 in which said valves are double acting valves which, when moved in one direction, open communication between said valve chambers and said supply passages and close communication between said valve chambers and said mixing chamber, and which when moved in the opposite direction close communication between said valve chambers and said supply passages and open communication between said valve chambers and said mixing chamber.

6. A mixing gun as claimed in claim 1 in which said housing comprises a block having a bore of circular cross section therein and a member of circular cross section mounted in said bore and extending through said block, said mixing chamber being formed in said member.

7. A mixing gun as claimed in claim 1 in which said housing comprises a block having a bore of circular cross section therein and a member of circular cross section mounted in said bore and extending through said block, said mixing chamber being formed in said member, a shaft extending longitudinally of said member, said shaft carrying an impeller extending into said mixing chamber, and means for rotating said shaft.

8. A mixing gun as claimed in claim 1 having a supply of solvent, means for placing said solvent under pressure, tubular conduits interconnecting said supply of solvent with said valve chambers, a valve on said tubular conduits, and means for synchronizing the opening and closing of said valve with the actuation of said valve in said valve chambers so that said solvent can only flow into said valve chambers when said valves in said valve chambers have closed communication between said valve chambers and said supply passages and open communication between said valve chambers and said mixing chamber.

References Cited by the Examiner

UNITED STATES PATENTS 3,111,389 11/63 Hansen et al. ------------ 259—7

CHARLES A. WILLMUTH, *Primary Examiner.*